Sept. 9, 1969 W. SCKERL 3,466,481

BRUSH HOLDER WITH GRIPPING LEVER FOR ELECTRICAL MACHINES

Filed Feb. 1, 1966 2 Sheets-Sheet 1

INVENTOR.
WALTER SCKERL
BY
ATTORNEYS

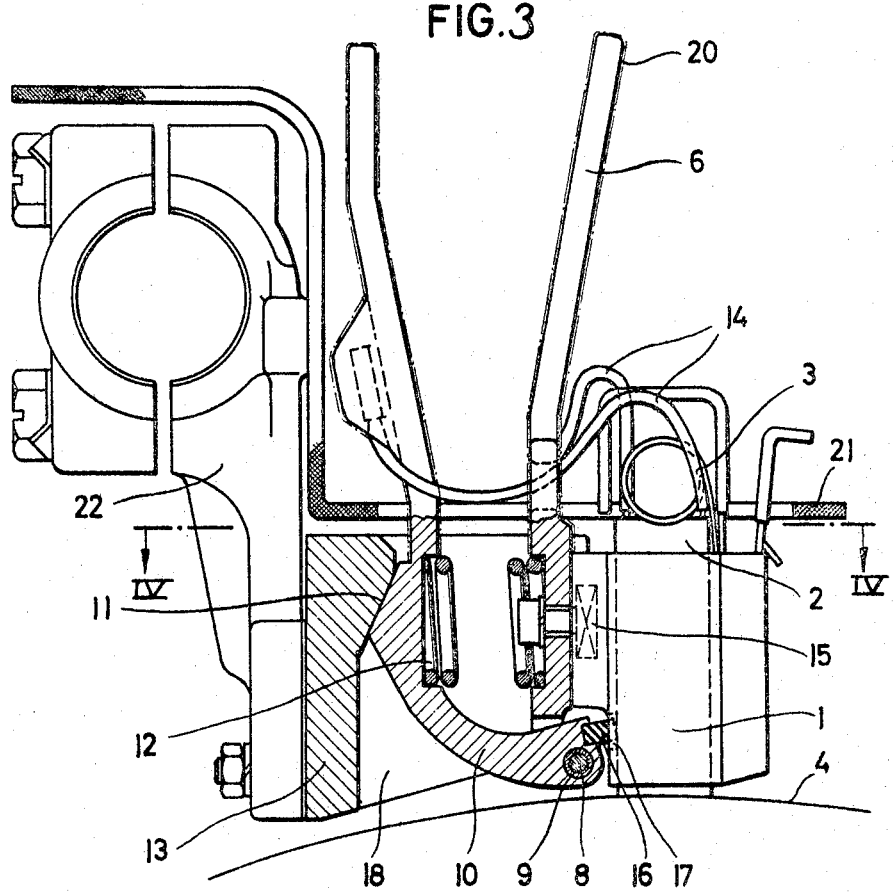
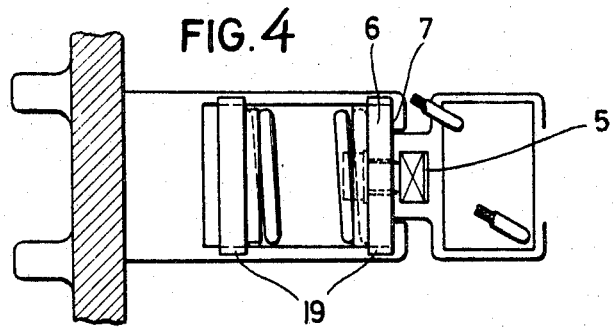

United States Patent Office 3,466,481
Patented Sept. 9, 1969

3,466,481
BRUSH HOLDER WITH GRIPPING LEVER FOR ELECTRICAL MACHINES
Walter Sckerl, Bad Godesberg, Germany, assignor to Ringsdorff-Werke G.m.b.H., Bad Godesberg-Mehlem, Germany, a corporation of Germany
Filed Feb. 1, 1966, Ser. No. 523,986
Claims priority, application Germany, Jan. 30, 1965, R 29,937
Int. Cl. H02k 13/10
U.S. Cl. 310—239          10 Claims

ABSTRACT OF THE DISCLOSURE

A brush holder for electric machines having a lever pivotally secured to a holder body, said lever being urged away from the holder body by a resilient member into engagement with a brush carriage for releasably securing the brush holder to the brush carriage.

---

Figure 1:
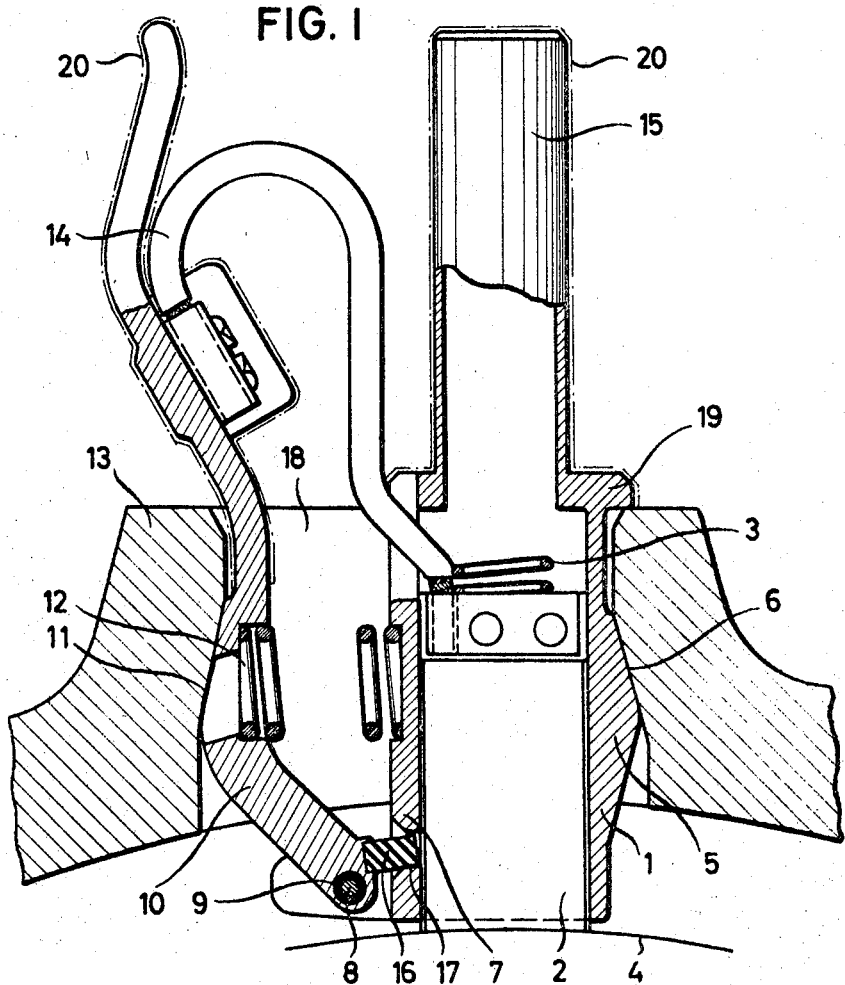

This invention relates to a brush holder for electric machines especially for turbine generators, which makes it possible, without danger to the operating personnel, to change the brushes while the machine is running.

In order to maintain presently known electric machines, temporary stopping for upkeep and maintenance results in a large economic loss to the owner. For example, turbo-generators belong to this class of machines. These machines are built so that the interval between the machine inspections—and thereby the stopping of the equipment driven thereby—is a period of several years.

According to the present state of the art, however, machine inspections cannot be avoided because the brushes on the slip ring, or on the commutator of an associated exciter, will have to be changed periodically since same do not have a life span as long as the period of time between the inspections. It is therefore necessary to either make this change of brushes during the operation of the machine and thereby endangering the operating personnel and risking damage to the machine or stopping the machine to make the change.

To simplify the changing of the brushes while the machine is in operation, more and more companies are using brushes without positive connections because with such brushes no screws for fastening the copper-stranded wire to the carbon brush have to be loosened and with such brushes no work is necessary on a machine while it is operating.

However, this process is not satisfactory if the carbon brush holder is arranged on the brush carrier in a position which is difficult to see and which is difficult to reach. Furthermore, the use of the brush without positive connections is impractical if high voltages per brush have to be transmitted.

Another apparatus provides a holder which can be exchanged together with the brushes while the machine is in operation (U.S. Patent No. 3,045,136). However, it is a disadvantage of this construction that in case of an installation mistake, for instance by missing the opening in the brush carrier during mounting of the brush holder, the holder comes into contact with the slip ring or with the commutator. Thus, especially in high-speed machines major damage can result to the machine, as well as to the operating personnel.

The invention described below will eliminate the above-mentioned disadvantages by a construction where, for changing the brushes, the holder and brush are removed together. However, said parts are designed in a way that any wrong installation as well as the possibility of touching the holder to the commutator is impossible. Furthermore, by insulating all of the holder parts which come in contact with the operator, the operator can work on said parts safely while the machine is operating.

The new construction provides a brush holding apparatus having a hand lever which is flexible laterally with respect to said holding apparatus and which is under pressure by means of a spring. The holder and the gripping lever are placed into a properly formed opening in a brush carrier or in a holder pocket which is in the form of a clamping element. In the operating positon, the holding apparatus and the gripping lever with their contact surfaces are supported by the brush carrier. The contact surfaces form an acute angle with respect to each other through which the holder by means of the gripping lever spring is pulled into the holder opening to the shoulder where the holder and/or the gripping lever contacts the brush carrier and consequently puts the holder into the desired position for operation. This contact at the same time prevents the holder from being put into the brush carrier too deeply and thereby protects the slip ring. By means of a special forming of the handle and gripping lever, it is not possible for the holder to be erroneously rotated through 180 degrees and thereby inserted improperly into the opening.

Figure 2:
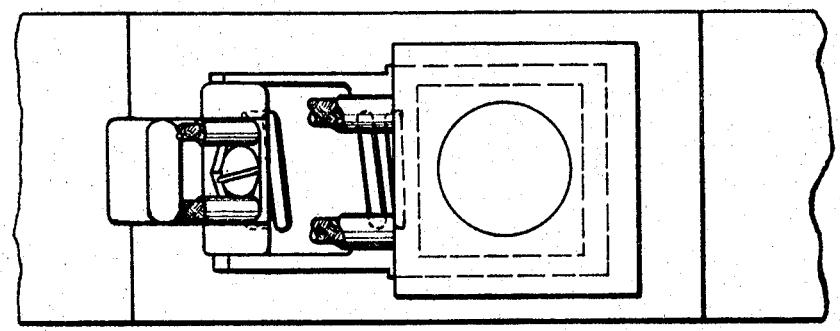

FIGURE 1 is a central longitudinal sectional view of a brush holder embodying the invention.
FIGURE 2 is a top view of the brush holder.
FIGURE 3 is a central longitudinal sectional view of a modification of the brush holder.
FIGURE 4 is a sectional view taken on line IV—IV in FIGURE 3.

The first example of construction is illustrated in FIGURE 1:

The holder 1 into which a brush 2 is inserted, is pressed by means of a coil spring 3 onto the slip ring or the commutator, hereinafter referred to as a slide body 4. At one side of the holder 5, lying in a direction tangentially of the slide body, there is provided a contact surface 6 which is positioned at an acute angle to the brush axis. On the opposite side of the holder 7, a gripping lever 10 is mounted onto the pivot bolt 8. The gripping lever 10 is provided also with a contact surface 11 forming an acute angle with respect to the brush axis when the holder is in the operating position. A pressure spring 12 arranged between the holder body 1 and the gripping lever 10 causes both of the contact surfaces 6 and 11 to bear with the necessary contact pressure against the brush carriage 13. The brush current preferably passes through the brush wire 14, through the gripping lever 10 and through the contact surface 11 to the brush carriage. The part of the brush current which flows directly from the brush to the holder body passes through the contact surface 6 to the brush carriage. To prevent the flow of current through the moving joint of the gripping lever and to prevent damage of same, the pivot bolt 8 is insulated from the gripping lever by insulation 9.

For installation of the holder and the brush the gripping lever 10 is drawn in the direction of the holder case 7. To accomplish this, the operator's hand grasps the gripping lever and the cylindrical holder 15 wherein the spring 3 is positioned. The rubber contact member 16 fastened to the gripping lever 10 is pushed thereby through a bore 17 in the holder case 7 onto the brush 2 and locks same within the holder body. Before tightening of the lever, the brush is inserted sufficiently into the holder body that it is somewhat held by the holder case.

In this condition, the holder is inserted into the appropriate opening 18 in the brush carrier. When the operator releases the gripping lever, the holder, under the pressure of the gripping lever spring 12 and of the contact surfaces positioned angularly with respect to each other, is put into its operating position. The shoulder 19 on the holder case prevents the holder case from tipping in the opening 18 and touching the slide body 4. At the same time, when the gripping lever is released by the operator, the brush 2 is set free of the rubber plunger 16 and the brush, under the pressure of the spring 3, contacts the slide body 4. The contact surfaces 6 and 11 provide the electrical connection between the slide body and the brush carrier.

For removing the holder and the brush from the brush carriage, the procedure is reversed.

To insure the safety of the operator during the change of the brushes and holders while the machine has voltage applied to it, the parts of the holder case 7, that is, the handle 15, the gripping lever 10 and the brush wire 14 within the reach of the operator are provided with an insulating protective layer 20.

Another example of construction of the invention is illustrated in FIGURES 3 and 4. Here a brush holder 1 is used in the common construction, into which the brush 2 is inserted and said brush, for instance, is pressed onto the slide body 4 by means of a roll spring 3. Into the fastening pocket 5 of the holder, a screw fastening device 15 is inserted by which a handle 6 is threaded to the holder. The side 7 of this handle which is to the holder is constructed as a contact surface. The other side of the gripping device comprises a gripping lever 10 which is mounted to the pivot bolt 8. The gripping lever 10 is provided with a contact surface 11 which lies at an acute angle to the brush axis. The pressure spring 12 arranged between handle 6 and the gripping lever provides the necessary contact pressure between the two contact surfaces so that they abut tightly against the holder pocket 13. The brush current preferably passes through the brush wires 14, through the gripping lever and through the contact surface to the holder pocket. The part of the brush current which passes directly to the holder body passes through the contact surface 7 to the holder pocket 13. To prevent current from flowing through the linkage of the gripping lever and damaging same, the pivot bolt 8 is insulated by means of the pivot brushing 9.

Similarly to the construction of FIGURE 1, the mounting of the holder and the brush is carried out by drawing the gripping lever 10 in the direction of the holder case by the contracting grasp of the operator's hand around handle 6 and gripping lever 10. Thus, a rubber plunger 16 which is fastened to the gripping lever is pushed through a bore in the holder case 17 onto the brush 2 and locks same within the holder body. Before the drawing of the pressure lever, the brush enters into the holder body sufficiently that it is somewhat held by the holder case.

In this condition, the holder is inserted into the opening 18. When the operator releases the gripping lever, the holder, under the pressure of the gripping lever spring and of the contact surfaces positioned angularly with respect to each other, enters into its operating position. The shoulders 19 on the handle and on the gripping lever prevent the holder from tipping in the opening 18 and touching the slide body 4. At the same time, when the gripping lever is released the brush 2 is released and under pressure of the spring 3 is caused to contact the slide body 4. The contact surfaces 7 and 11 provide the electrical connection between the slide body and the brush pocket 13 and thence to the clamp-piece 22.

For removing the holder and the brush from the brush carriage, the procedure is reversed.

To insure the safety of the operator during a change of the brushes or holder while the machine has voltage applied to it, the parts of the holder case (the handle, the gripping lever and the brush wires), within the reach of the operator are provided with an insulating protective film 20. The other parts can be covered with a shield of insulative material 21.

Accordingly, the advantages of this construction are:

(1) For the machine: Safe mounting of the brushes and brush holder because the brush holder cannot touch the slide body.

(2) For the operating personnel: Safe handling of the brush holders and brushes in that all of the parts touched with the hand are insulated and that the brush is clamped tightly into the holder box.

(3) For fixing the holder in the holder receiver: The self-acting pulling action of the holder into its provided position by the inclined contact surfaces on the holder and on the gripping lever which are at an acute angle with respect to each other.

(4) For current transmission: Double security for the transmission of current through the contact surface of the holder and brush wire and the contact surface on the gripping lever.

The embodiments of the invention in which an exclusive property or privilege is claimed are defined as follows:

1. Apparatus for releasably securing a brush holder to a brush carriage, comprising:

a brush holder body having a handle thereon, said handle being electrically insulated from said brush holder body, said brush holder body having means thereon for resiliently urging a brush element toward a rotating cylindrical contact surface;

a lever pivotally secured at one end to said brush holder body and extending laterally therefrom, resilient means disposed between said brush holder body and said lever for urging said lever pivotally away from said brush holder body and into engagement with said brush carriage for releasably securing said brush holder to said brush carriage;

an electrically insulated handle secured to one end of said lever opposite said pivotal securement for moving said lever out of engagement with said brush carriage to thereby release said brush holder from said brush carriage;

whereby a manual engagement of said electrically insulated handle on said lever and said electrically insulated handle on said brush holder body and urging said handles toward each other, said brush holder will be released from said brush carriage.

2. The apparatus defined in claim 1, including means electrically insulating said lever from said brush holder body.

3. The apparatus defined in claim 2, wherein said lever has an opening in said one end thereof and said brush holder body has a pin projecting therefrom, said pin being received in said opening to pivotally support said lever; and wherein said electrical insulating means comprises electrical insulation sleevably mounted on said pin in said opening in said one end of said lever.

4. The apparatus defined in claim 1, including means for providing an electrical connection to said brush element in said brush holder body.

5. The apparatus defined in claim 1, including means on said brush holder body for providing a limit to prevent said brush holder body from projecting too far into said brush carriage.

6. The apparatus defined in claim 1, wherein said brush holder body is hollow and having at least one opened end therein, said brush element disposed in said hollow brush holder body, a spring disposed in said brush holder body for urging said brush element out of said body through said opened end into engagement with said rotating cylindrical contact surface;

including means defining an opening in the wall of said brush holder body; and further including clamping means secured to said lever and projecting through said opening whereby said clamping means will engage said brush element to hold said brush element in said brush holder body when said lever is moved out of engagement with said brush carriage to thereby release said brush holder body from said brush carriage.

7. The apparatus defined in claim 6, wherein said clamping means comprises a rubber plunger member.

8. The apparatus defined in claim 1, wherein said brush holder body is hollow and having at least one opened end therein, a brush element disposed in said hollow brush holder body, a spring disposed in said body urging said brush out of said body through said opened end into engagement with said rotating cylindrical contact surface;

wherein said brush carriage includes means defining an opening therein, said opening having an inclined wall portion; and wherein said lever has an inclined surface thereon at the same inclination as said inclined wall portion, said inclined surface being adapted to engage said inclined wall portion whereby said brush element being resiliently urged into engagement with said cylindrical contact surface will also cause said inclined surface to engage said inclined wall portion to secure said brush holder in said brush carriage.

9. The apparatus defined in claim 8, wherein said opening in said brush carriage has a pair of inclined wall portions disposed at an acute angle to each other; and wherein said lever has a pair of inclined surfaces thereon disposed at an actue angle to each other and at the same inclination as said inclined wall portions, said inclined surfaces being adapted to engage said inclined wall portions whereby said brush element being resiliently urged into engagement with said cylindrical contact surface will also cause said inclined surfaces to engage said inclined wall portions to secure said brush holder in said brush carriage.

10. The apparatus defined in claim 1, wherein said resilient means disposed between said brush holder body and said lever is a spring arranged perpendicular to said brush holder body and is independent of the resilient means urging said brush toward said rotating cylindrical contact surface.

References Cited

UNITED STATES PATENTS

| 741,945 | 10/1903 | Thompson | 310—247 |
| 990,492 | 4/1911 | Noble et al. | 310—247 |
| 3,075,110 | 1/1963 | Pepworth | 310—240 |

FOREIGN PATENTS

| 492,828 | 4/1919 | France. |

WARREN E. RAY, Primary Examiner

D. F. DUGGAN, Assistant Examiner

U.S. Cl. X.R.

310—245